United States Patent
Krishnamoorthy et al.

(10) Patent No.: US 6,959,727 B2
(45) Date of Patent: Nov. 1, 2005

(54) SIPHONABLE CHECK VALVE AND METHOD OF MAKING SAME

(75) Inventors: Pk Haridass Krishnamoorthy, Ypsilanti, MI (US); Steven A. Verzyl, Ypsilanti, MI (US); Robert P. Benjey, Dexter, MI (US)

(73) Assignee: Eaton Corporation, Cleveland, OH (US)

( * ) Notice: Subject to any disclaimer, the term of this patent is extended or adjusted under 35 U.S.C. 154(b) by 199 days.

(21) Appl. No.: 10/135,693

(22) Filed: Apr. 30, 2002

(65) Prior Publication Data

US 2003/0201014 A1 Oct. 30, 2003

(51) Int. Cl.⁷ .............................. F16K 15/02; B65B 1/04
(52) U.S. Cl. ...................... 137/588; 137/151; 137/538; 137/592; 251/356; 141/301
(58) Field of Search ................................ 137/151, 538, 137/587, 588, 592; 251/356; 141/301

(56) References Cited

U.S. PATENT DOCUMENTS

| | | | | |
|---|---|---|---|---|
| 2,782,801 A | * | 2/1957 | Ludwig ..................... | 251/356 |
| 6,056,029 A | * | 5/2000 | Devall et al. ............... | 137/151 |
| 6,234,195 B1 | * | 5/2001 | Kippe et al. ................ | 137/588 |
| 6,648,016 B2 | * | 11/2003 | Farrenkopf et al. ......... | 137/588 |
| 2003/0116202 A1 | * | 6/2003 | Krishnamoorthy et al. . | 137/593 |
| 2003/0150498 A1 | * | 8/2003 | Williams ............... | 137/625.65 |

* cited by examiner

*Primary Examiner*—John Rivell
(74) *Attorney, Agent, or Firm*—Anna M. Shih; Roger A. Johnston

(57) ABSTRACT

A check valve for connection in a fuel tank filler tube. The valve has a tubular body with a plurality of radially inwardly extending vanes or ribs in the inlet end about a portion of the circumference. The ribs are tapered in the flow direction to deflect the end of a siphoning hose to an offset opening. A valve seat and poppet with a tapered surface are disposed downstream of the ribs, clearance apertures are formed in the side of the tubular body downstream of the valve seat. The tapered surface of the poppet, upon being opened by insertion of the end of a siphoning hose deflects the hose outwardly through the clearance apertures to facilitate further insertion into the tank. The poppet is biased normally closed by a spring.

13 Claims, 3 Drawing Sheets

SIPHONABLE CHECK VALVE AND METHOD OF MAKING SAME

BACKGROUND OF THE INVENTION

The present invention relates to filler tubes for motor vehicle fuel tanks and the problems related to controlling emission of fuel vapors therefrom during refueling operations.

Currently, it is required to provide for controlling the emission to the atmosphere of fuel vapor during refueling when a nozzle has been inserted into the fuel tank filler tube for discharging fuel into the filler tube. Currently, vehicle fuel tank filler tubes are designed to have a baffle in the filler tube with a flapper valve having aperture sized to closely interfit the fuel discharge nozzle and thereby minimize the opening available for fuel vapor emission during refueling.

However, it is now required to provide for withdrawal of fuel from the tank through the filler tube in the event that in service removal of the tank is required after the initial assembly of the vehicle. The withdrawal of fuel from the vehicle tank is usually accomplished by insertion of a siphoning hose through the filler tube into the tank. However, where a check valve has been employed in the filler tube downstream of the flapper valve to prevent overfill or liquid escape during vehicle rollover it has been found quite difficult to push the end of the siphon hose through the check valve to the bottom of the fuel tank once the hose has entered the tank. It has been experienced that the end of the siphon hose lodges in the check valve.

It has thus been desired to provide a way of incorporating a check valve in a fuel tank filler tube such that it is easy to push a siphoning hose into the filler tube and through the check valve for withdrawal of fuel from the tank in the event that it is necessary to remove the tank from the vehicle for service. It has further been desired to provide such a siphonable filler tube check valve arrangement which is sufficiently low in manufacturing costs to be competitive in high volume automotive production and which is easy to assemble and install into the tank filler during manufacture of the tank and assembly into the vehicle.

BRIEF SUMMARY OF THE INVENTION

The present invention provides a filler tube assembly for attachment to a vehicle fuel tank which employs a tubular body having an annular valve seat therein with a poppet valve therein which is biased to the closed position against the seating surface provided about the interior of the body. The tubular body has radially inwardly extending tapered ribs or vanes provided on the inlet end of the body upstream of the valve seating surface for diverting a siphoning hose laterally; and, the surface of the poppet is tapered to divert the end of the siphoning hose laterally through an aperture formed in the side of the filler tube body downstream of the valve seating surface. The poppet valve includes a resilient seal integrally formed thereon which provides for sealing against the valve seating surface with a minimum of bias force and thus minimum resistance to opening is encountered upon insertion of a refueling nozzle or siphoning hose therein.

DETAILED DESCRIPTION OF THE INVENTION

Figure 2:
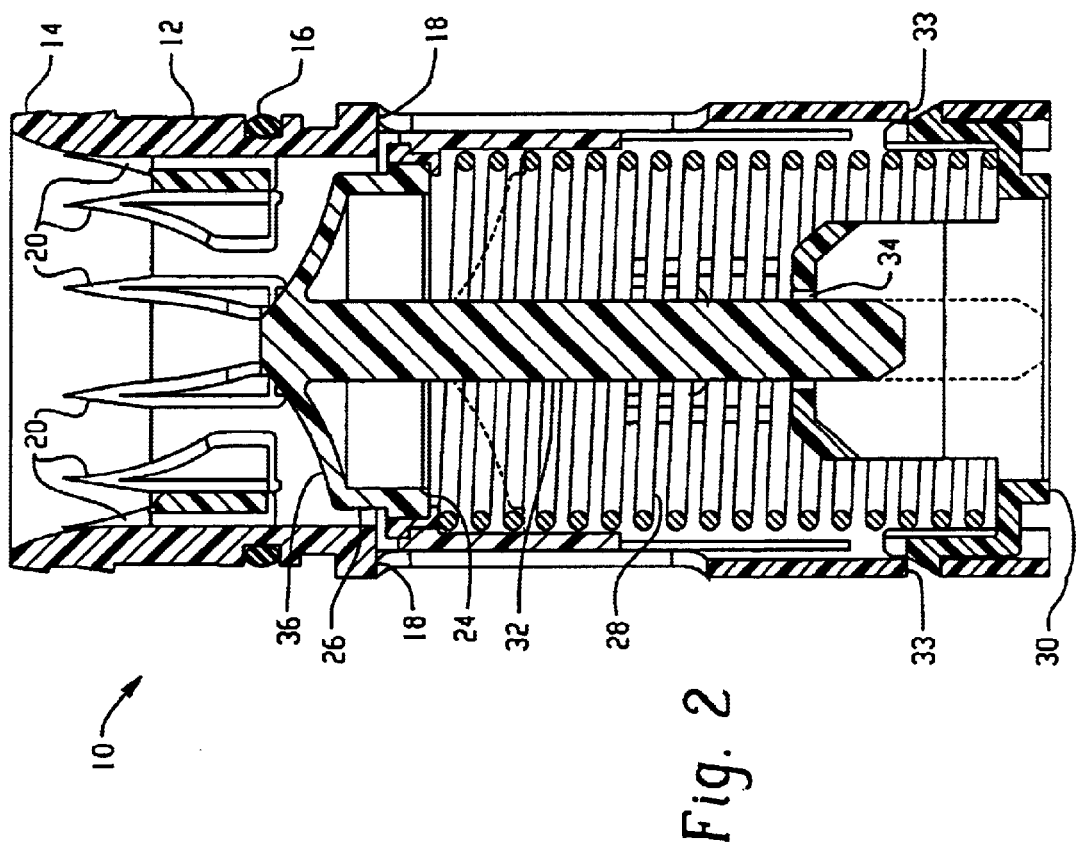
FIG. 2 is a cross-section taken along section indicating lines 2—2 of FIG. 1.
Figure 1:
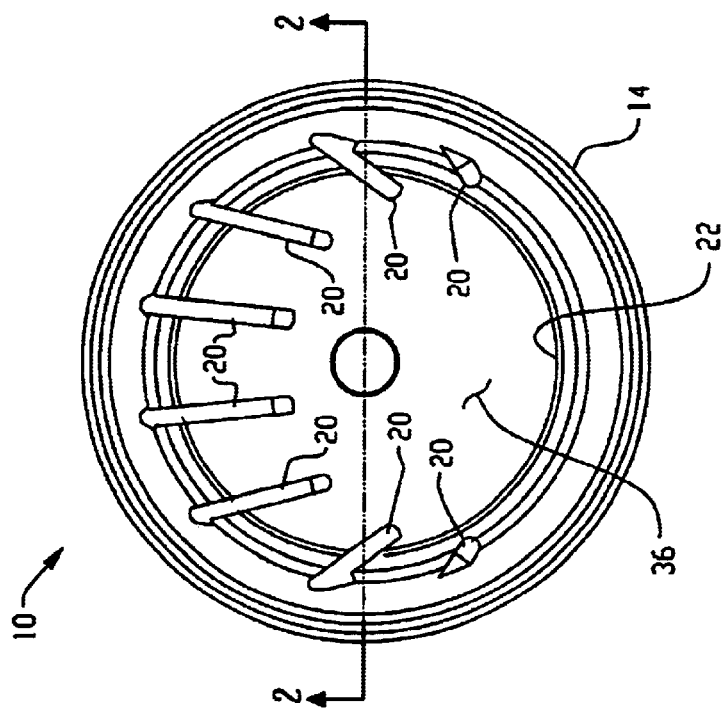
FIG. 1 is a top view of a filler tube check valve of the present invention therein.

Referring to FIGS. 1 and 2, the valve assembly of the present invention is indicated generally at 10 and includes a tubular housing or body 12. The upper end of the body 12 has annular barbs 14 provided on the outer surface thereof for connection to the lower end of the tank filler tube (not shown). A sealing ring 16 is provided below the barbs 14 to provide a positive seal between the upper end of the body 12 and the filler tube.

The inner periphery of the body 12 adjacent the upper end has a plurality of circumferentially spaced radially inwardly extending ribs 20 preferably, by not necessarily formed integrally therewith, with each of the ribs having the inward edge thereof tapered in an axial direction as shown in FIG. 2. The radially inward edges of the ribs 20 define, in cooperation with portions 22 of the opposite side of the inner periphery of the body 12, a reduced cross-section opening which is offset from the center of the body. This offset opening is operative to receive therein the end of a siphoning hose (not shown) when such is inserted through the unshown filler tube and upper open end of the body 12. Upon insertion of such an unshown siphoning hose, the tapered edges of the ribs 20 serve to deflect or cam the end of the siphoning hose into the offset opening.

An annular valve seating surface 24 is formed about the inner periphery of the body 14 at a location below, i.e. downstream of the ribs 20. The tubular body 12 has at least one and preferably a plurality of circumferentially spaced apertures 18 formed in the side walls of the body downstream of the annular valve seating surface 24, which apertures 18 are of sufficient size to provide adequate clearance for a siphoning hose to extend outwardly therethrough. A moveable poppet 26 is disposed for sealing against the valve seating surface 24; and, the poppet is biased in an upward direction by a spring 28 having its upper end registered against the undersurface of the poppet. The lower end of spring 28 is retained by a suitable retainer 30 disposed in the lower end of the housing or body 12 and retained therein by barbs 31 engaging corresponding slots 33 appropriately located in the body.

Poppet 26 has a pilot 32 formed thereon which extends downwardly within the spring and through an aperture 34 provided in the retainer 30 for guiding movement of the poppet. The upper end of the poppet 26 has a tapered surface 36 which serves to deflect the end of a siphoning hose (not shown) outwardly or laterally upon insertion of the end of the hose into contact with tapered surface 26 and effecting downward movement of the poppet to the position shown in dashed outline in FIG. 2.

Figure 3:
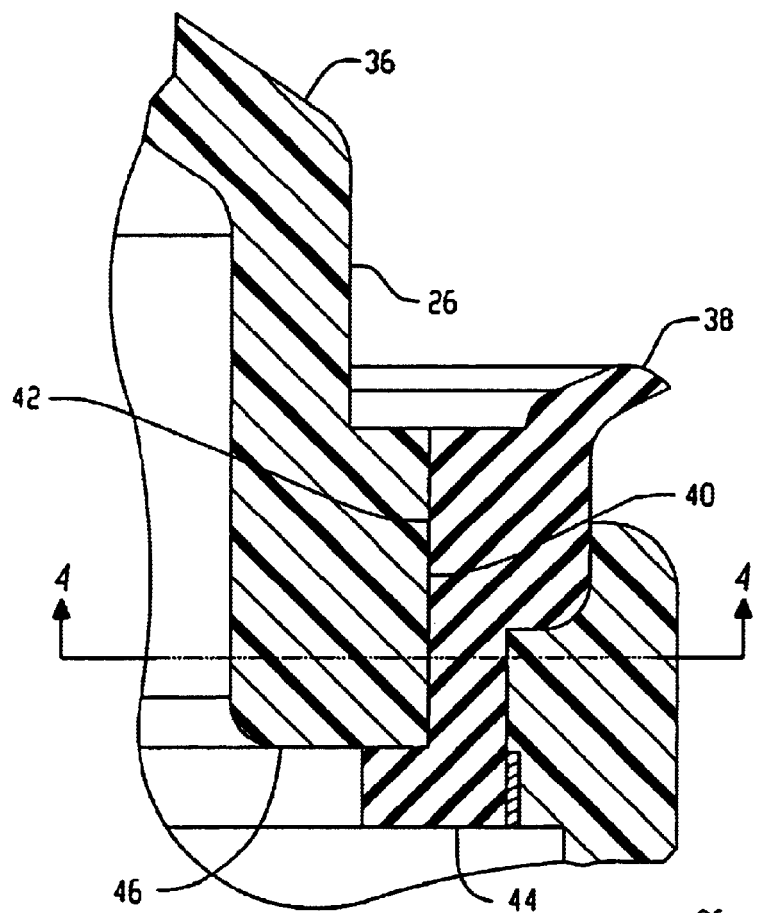
FIG. 3 is an enlarged view of a portion of FIG. 2.
Figure 4:
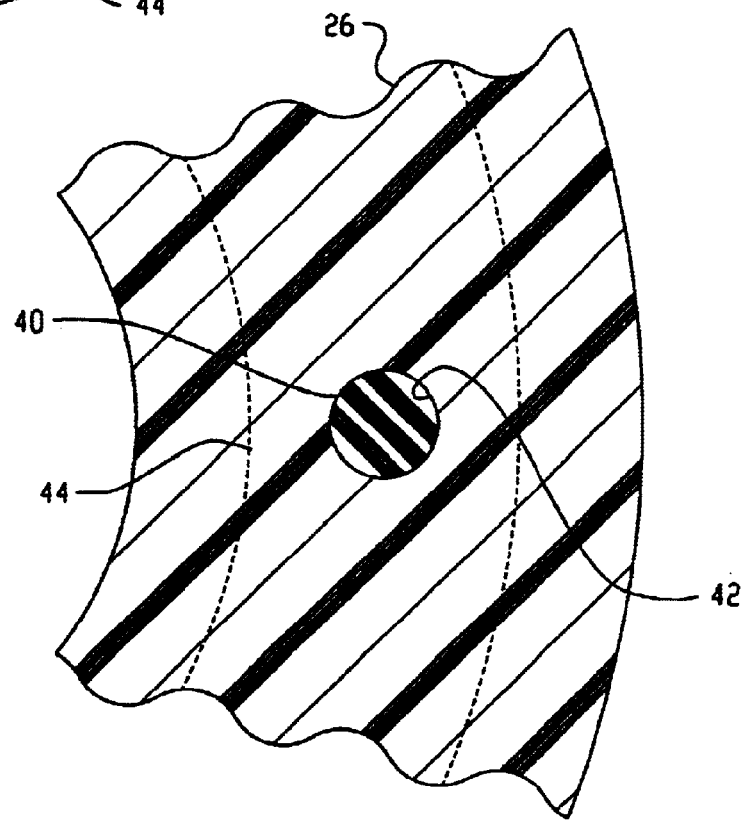
FIG. 4 is a section view taken along section indicating lines 4—4 of FIG. 3; and, FIG. 5 is an exploded view of the valve of FIG. 1.
Figure 5:
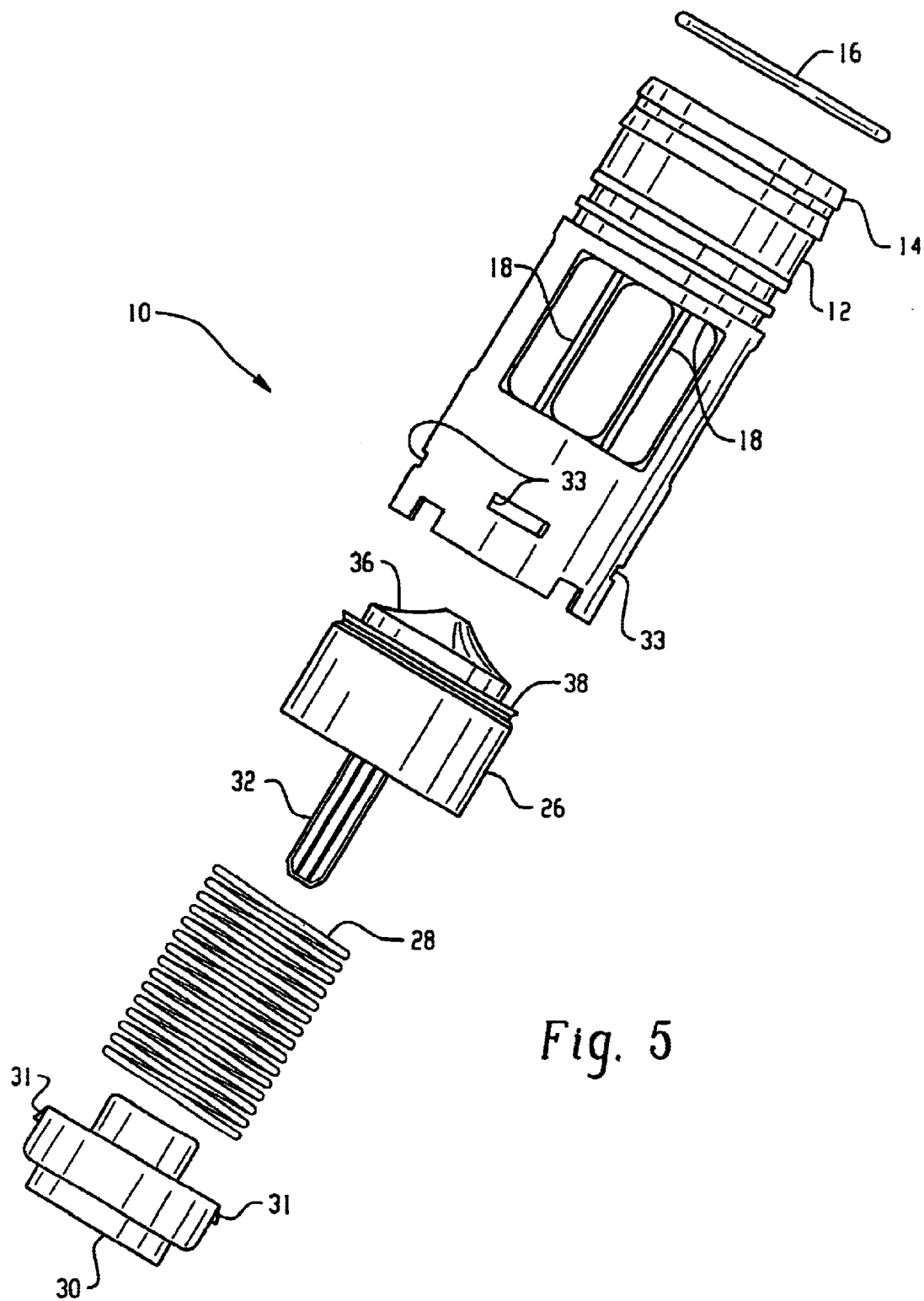

Referring to FIGS. 3 and 4, the poppet 26 has an annular resilient seal 38 formed thereon preferably by molding over the poppet. Seal 38 has integral portions thereof denoted by reference numeral 40 in FIGS. 3 and 4 extending through a plurality of circumferentially spaced aperture 42 formed in an annular shoulder in the poppet. Seal 38 has an annular flange 44 formed integrally with portions 40 and extending about the undersurface 46 of the shoulder for retaining the seal 38 on the poppet. In the presently preferred practice, the seal 38, portions 40 and flange 44 are formed integrally on the poppet by placing the poppet in a mold (not shown) and overmolding with a suitable elastomeric material.

The body 12, poppet 26 and retainer 30 may be formed of any suitable engineered resinous material which has electrostatic dissipative properties. In the present practice of the invention polythalamide (PTA) material fractionally filled with particulate glass and carbon has been found to be satisfactory; however, other resinous materials and particulate fill may be employed.

The present invention thus provides a one-way shutoff valve for incorporation between a filler neck and a fuel tank for preventing escape of fuel during sloshing or vehicle tilting or rollover and provides for opening by insertion of a flexible siphoning hose into the filler neck and thereby permits the hose to enter the tank. The present invention employs deflector vanes in the interior of the tubular valve body upstream of the poppet; and, upon opening of the poppet by the insertion of a siphoning hose, the end of the hose is deflected by the surface of the poppet outwardly through apertures formed in the side wall of the valve body.

Although the invention has hereinabove been described with respect to the illustrated embodiments, it will be understood that the invention is capable of modification and variation and is limited only by the following claims.

What is claimed is:

1. A check valve assembly for use in a fuel tank filler tube comprising:
    (a) a valve body having a valving passage with an inlet having a plurality of spaced projections disposed about a portion of the inner periphery of the passage adjacent the inlet;
    (b) an annular valve seat disposed in said passage downstream of said projections;
    (c) a valve poppet slidably disposed in the body with a resilient valving surface thereon operable for seating against said annular valve seat;
    (d) an aperture formed in the wall of said passage downstream of said valve seat and located in a portion of said body to be disposed within the tank; and,
    (e) means biasing said valve member in a direction closing said resilient valving surface on said valve seat, wherein upon insertion of one end of a siphon hose in said inlet, said projections are operable to direct the said one end through said aperture thereby facilitating further insertion into the tank.

2. The assembly defined in claim 1, wherein said projections are configured to direct the said end of the siphon hose to one side of said passage.

3. The assembly defined in claim 1, wherein said means biasing said valve member comprises a spring.

4. The assembly defined in claim 1, wherein said resilient valving surface comprises an annular lip formed of elastomeric material.

5. The assembly defined in claim 1, wherein said poppet has a generally inverted cup-shaped configuration and said resilient valving surface comprises an annular member overmolded on said poppet.

6. The assembly defined in claim 5, wherein said poppet has a plurality of spaced apertures formed therein and said overmold includes material extending through said apertures to retain said overmold in place on said poppet.

7. The assembly defined in claim 5, wherein said body includes a guide surface and said cup-shaped poppet includes a projection extending from the closed end of said cup-shape contacting said guide surface for guiding movement of the poppet.

8. The assembly defined in claim 7, wherein said guide surface comprises an aperture formed in a bulkhead in said body.

9. A method of making a check valve for use in a fuel tank filler tube comprising:
    (a) providing a body having a flow passage therethrough with an inlet and outlet end and forming a plurality of projections on one side of the passage in the inlet end;
    (b) forming an annular valve seat in said passage downstream of said projections;
    (c) forming a siphon hose aperture in one side of said passage downstream of the valve seat;
    (d) providing a poppet and overmolding an annular resilient seal on the poppet; and,
    (e) disposing the poppet in said passage for guided movement therein and biasing the poppet in a direction to close the annular seat on the valve seat.

10. The method defined in claim 9, wherein said step of overmolding includes forming a plurality of spaced apertures therethrough and molding elastomeric material therein and retaining the seal on the poppet.

11. The method defined in claim 9, wherein said step of disposing the poppet for guided movement includes forming a projection on the poppet and sliding said projection in an aperture formed on the body.

12. The method defined in claim 9, wherein said step of forming a plurality of projections in one side of the passage includes forming a plurality of radially inwardly extending vanes and locating the vanes about one half of the circumference of the passage.

13. A method of making a check valve for use in a fuel tank filler tube comprising:
    (a) providing a body having a flow passage therethrough with an inlet and outlet end and forming a plurality of projections on one side of the passage in the inlet end;
    (b) forming a valve seat in said passage downstream of said projections;
    (c) forming a siphon hose aperture in one side of said passage downstream of the valve seat;
    (d) providing a moveable valve member with an annular resilient seal thereon; and,
    (e) disposing the moveable valve member for guided movement therein and biasing the valve member in a direction to close the annular seal on the valve seat.

* * * * *